United States Patent
Phadnis et al.

(10) Patent No.: US 10,601,880 B2
(45) Date of Patent: Mar. 24, 2020

(54) CONFERENCE RECONSTRUCTION IN SIP NETWORKS

(71) Applicant: Avaya Inc., Santa Clara, CA (US)

(72) Inventors: Mohan Vinayak Phadnis, Pune (IN); Sreekanth Subrahmanya Nemani, Pune (IN)

(73) Assignee: Avaya Inc., Santa Clara, CA (US)

( * ) Notice: Subject to any disclaimer, the term of this patent is extended or adjusted under 35 U.S.C. 154(b) by 531 days.

(21) Appl. No.: 14/802,015

(22) Filed: Jul. 17, 2015

(65) Prior Publication Data
US 2017/0019437 A1 Jan. 19, 2017

(51) Int. Cl.
| H04L 29/06 | (2006.01) |
| G06F 11/00 | (2006.01) |
| H04M 3/42 | (2006.01) |
| H04L 12/58 | (2006.01) |

(52) U.S. Cl.
CPC ...... *H04L 65/1083* (2013.01); *H04L 65/1006* (2013.01); *H04L 65/403* (2013.01)

(58) Field of Classification Search
CPC ........... H04L 29/06176; H04L 65/1083; H04L 65/1006; H04L 65/403
See application file for complete search history.

(56) References Cited

U.S. PATENT DOCUMENTS

| 7,417,988 | B1 | 8/2008 | Tripathi et al. |
| 8,363,812 | B1 * | 1/2013 | Robbins ............... H04L 65/1076 |
| | | | 379/211.01 |
| 8,495,231 | B1 * | 7/2013 | Katapadi ............. H04L 65/1006 |
| | | | 379/201.01 |
| 8,750,291 | B2 | 6/2014 | Balasaygun et al. |
| 9,025,438 | B1 * | 5/2015 | Palmer ................... H04L 45/28 |
| | | | 370/217 |
| 9,116,772 | B2 | 8/2015 | Ohrstrom-Sandgren et al. |

(Continued)

OTHER PUBLICATIONS

Official Action for U.S. Appl. No. 15/284,125, dated Dec. 14, 2018 13 pages.

(Continued)

*Primary Examiner* — Kevin T Bates
*Assistant Examiner* — Mark A Scott
(74) *Attorney, Agent, or Firm* — Sheridan Ross P.C.

(57) ABSTRACT

During a Session Initiation Protocol dialog setup, the user agent sends an INVITE message with an SDP offer to the conference controller, and the conference controller provides to a media gateway a unique session identifier, a unique conference identifier, and optionally at least one of feature information and/or policy information. If the conference controller restarts, the media gateway may provide the conference controller the unique session identifier, the unique conference identifier, and the optional feature and/or policy information. The conference controller may then generate an out-of-dialog SIP REFER message that includes the unique session identifier and the unique conference identifier and provide the message to the user agent. The user agent, upon receiving the REFER message, may identify a dialog needing replacing, and may provide the conference controller a new INVITE message that allows the conference controller to reconstruct the SIP dialog and optional feature and/or policy information if needed.

19 Claims, 7 Drawing Sheets

(56) References Cited

U.S. PATENT DOCUMENTS

| | | | |
|---|---|---|---|
| 2005/0286466 A1* | 12/2005 | Tagg | H04L 12/2856 370/329 |
| 2006/0142010 A1 | 6/2006 | Tom et al. | |
| 2006/0146798 A1* | 7/2006 | Harton | H04L 29/06027 370/352 |
| 2006/0153064 A1 | 7/2006 | Caballero-McCann et al. | |
| 2006/0270447 A1 | 11/2006 | Everson et al. | |
| 2006/0276192 A1 | 12/2006 | Dutta et al. | |
| 2006/0294245 A1* | 12/2006 | Raguparan | H04L 29/06027 709/227 |
| 2007/0201480 A1* | 8/2007 | Bao | H04L 29/06027 370/395.2 |
| 2007/0232284 A1 | 10/2007 | Mason et al. | |
| 2008/0037447 A1* | 2/2008 | Garg | H04L 29/06027 370/260 |
| 2008/0069011 A1* | 3/2008 | Sekaran | H04L 12/1813 370/260 |
| 2008/0098117 A1* | 4/2008 | Fukuhara | H04L 69/40 709/227 |
| 2008/0240091 A1* | 10/2008 | Kesavan | H04L 65/1006 370/389 |
| 2008/0248763 A1* | 10/2008 | Park | H04W 4/10 455/90.2 |
| 2008/0253363 A1 | 10/2008 | Altberg et al. | |
| 2008/0316976 A1* | 12/2008 | Thompson | H04W 92/02 370/335 |
| 2009/0019158 A1 | 1/2009 | Langen et al. | |
| 2009/0119389 A1* | 5/2009 | Mu | H04L 12/1827 709/219 |
| 2009/0177785 A1* | 7/2009 | Reid | H04L 29/06027 709/228 |
| 2009/0238358 A1* | 9/2009 | Ramanathan | H04M 3/42042 379/221.03 |
| 2009/0285175 A1 | 11/2009 | Nix | |
| 2010/0009674 A1* | 1/2010 | Sapkota | H04W 36/36 455/426.1 |
| 2010/0034367 A1 | 2/2010 | Das et al. | |
| 2010/0118742 A1 | 5/2010 | Ezell | |
| 2010/0142411 A1 | 6/2010 | Holm et al. | |
| 2010/0165889 A1* | 7/2010 | Madabhushi | H04M 3/2227 370/261 |
| 2010/0316048 A1* | 12/2010 | Reyes | H04L 12/66 370/389 |
| 2011/0090899 A1 | 4/2011 | Fedorov | |
| 2011/0122863 A1* | 5/2011 | Balasaygun | H04M 15/00 370/352 |
| 2011/0249073 A1* | 10/2011 | Cranfill | H04N 7/147 348/14.02 |
| 2011/0273526 A1 | 11/2011 | Mehin et al. | |
| 2011/0286365 A1* | 11/2011 | Simoes | H04M 3/428 370/260 |
| 2012/0033661 A1* | 2/2012 | Knappe | H04M 1/2535 370/352 |
| 2012/0069983 A1* | 3/2012 | Sall | H04M 3/563 379/202.01 |
| 2012/0072783 A1* | 3/2012 | Li | G06F 11/0769 714/57 |
| 2012/0089680 A1 | 4/2012 | Ono et al. | |
| 2012/0243673 A1* | 9/2012 | Carr | H04L 12/1818 379/202.01 |
| 2012/0258712 A1* | 10/2012 | Rozinov | H04L 61/1535 455/435.1 |
| 2012/0320736 A1* | 12/2012 | Hillier | H04M 3/2263 370/218 |
| 2013/0054698 A1* | 2/2013 | Lee | G06Q 30/0259 709/204 |
| 2013/0077539 A1 | 3/2013 | Averill et al. | |
| 2013/0189967 A1 | 7/2013 | Ritter et al. | |
| 2013/0212242 A1 | 8/2013 | Mendiratta | |
| 2013/0268511 A1* | 10/2013 | Bailey | G06F 17/30899 707/722 |
| 2013/0288671 A1* | 10/2013 | Keller | H04W 76/18 455/433 |
| 2013/0311825 A1* | 11/2013 | Brunson | H04L 65/1096 714/16 |
| 2013/0346789 A1* | 12/2013 | Brunel | H04M 3/42314 714/4.11 |
| 2014/0089915 A1 | 3/2014 | Haserodt et al. | |
| 2014/0095723 A1* | 4/2014 | Ezell | H04L 67/141 709/227 |
| 2014/0101322 A1 | 4/2014 | Nissim et al. | |
| 2014/0185492 A1 | 7/2014 | Liu et al. | |
| 2014/0214972 A1* | 7/2014 | Nemani | H04L 65/1006 709/206 |
| 2014/0269446 A1* | 9/2014 | Lum | H04L 65/1006 370/259 |
| 2014/0280720 A1* | 9/2014 | Bischoff | G06F 9/5072 709/217 |
| 2015/0106528 A1* | 4/2015 | Somes | H04L 67/141 709/228 |
| 2015/0188727 A1* | 7/2015 | Bruner | H04L 12/4633 370/329 |
| 2015/0334241 A1* | 11/2015 | Noldus | H04L 65/1016 455/413 |
| 2015/0358171 A1 | 12/2015 | Rosenberg | |
| 2016/0006819 A1* | 1/2016 | Tarricone | H04L 69/24 709/228 |
| 2016/0112475 A1* | 4/2016 | Lawson | H04L 65/403 709/204 |
| 2016/0149966 A1* | 5/2016 | Remash | H04L 65/1096 370/351 |
| 2016/0212074 A1* | 7/2016 | Yu | H04N 7/152 |
| 2016/0366189 A1* | 12/2016 | Hart | H04L 65/1006 |
| 2017/0026424 A1 | 1/2017 | Sandgren et al. | |
| 2017/0034223 A1 | 2/2017 | Arscott et al. | |
| 2017/0094024 A1 | 3/2017 | Braudes et al. | |
| 2017/0099323 A1 | 4/2017 | Sandgren | |

OTHER PUBLICATIONS

Official Action for U.S. Appl. No. 15/284,125, dated Aug. 12, 2019 15 pages.

\* cited by examiner

CONFERENCE RECONSTRUCTION IN SIP NETWORKS

FIELD OF THE INVENTION

The systems and methods relate to reconstructing a conference call and in particular preserving and reconstructing a state of a conference call after call data is lost.

BACKGROUND

Voice over Internet Protocol (VoIP) systems employ session control protocols, such as the Session Initiation Protocol (SIP), to control the set-up, modification, and tear-down of calls as well as the selection of audio and video codecs, which encode speech and video allowing transmission over an IP network as digital audio and video via one or more media streams. The advantage to VoIP is that a single network can be utilized to transmit data packets as well as voice and video packets between users, thereby greatly simplifying communications. SIP is an open signaling protocol for establishing many kinds of real-time and near-real-time communication sessions, which may also be referred to as dialogs. Examples of the types of communication sessions that may be established using SIP include voice, video, and/or instant messaging. These communication sessions may be carried out on any type of communication device such as a personal computer, laptop computer, telephone, cellular phone, Personal Digital Assistant, etc. One key feature of SIP is its ability to use an end-user's Address of Record (AOR) as a single unifying public address for all communications. Thus, in a world of SIP-based communications, a user's AOR becomes their single address that links the user to all of the communication devices associated with the user. Using this AOR, a caller can reach any one of the user's communication devices, also referred to as SIP User Agents (UAs), without having to know each of the unique device addresses or phone numbers.

That is, SIP supports the initiation, modification, and termination of media sessions between SIP UAs. These sessions are managed by SIP dialogs, which represent a SIP relationship between a pair of user agents. Because dialogs are between pairs of SIP UAs, SIP'S usage for two-party communications (such as a phone call) is obvious. Communications sessions with multiple participants, however, are more complicated. SIP can support many models of multi-party communications. One, referred to as loosely coupled conferences, makes use of multicast media groups. In the loosely coupled model, there is no signaling relationship between participants in the conference and there is no central point of control or conference server.

In another model, sometimes referred to as the tightly coupled conference, there is a central point of control. Each participant connects to this central point. The central point provides a variety of conference functions and may possibly perform media mixing functions as well. Tightly coupled conferences are not directly addressed by RFC 3261, although basic participation is possible without any additional protocol support. Currently, when a conference call is established between SIP User Agents, the conference is controlled by an entity that would act as a Conference Controller. The media for the conference call generally flows through one or more Media Gateways, which are controlled by the Conference Controller utilizing a media control protocol like H.248/Megaco or MSML. If the Conference Controller restarts or experiences a service interruption due to some event, such as a power failure or other catastrophic event, the media path between one or more of the SIP User Agents and the Media Gateway may be maintained, but the call dialog, e.g. signaling paths, is never reestablished. That is, the call may stay in a connection preservation mode where the media is available but the signal pathways are not. Accordingly, features such as adding a new participant, transferring calls, and placing a call on hold for example, will not work using the existing media path while in the connection preservation mode.

SUMMARY

It is with respect to the above issues and other problems that the embodiments presented herein were contemplated. That is, in accordance with embodiments of the present disclosure, systems and methods are presented for reconstructing a signaling path between a user agent and a conference controller following a conference controller restart. Currently, when there is a conference call established between SIP UAs, the conference is controlled by an entity that would act as a conference controller, for example a Communication Manager or Avaya Aura Conferencing. The media for the conference flows through either one or more media gateways, which are controlled by the conference controller using a media control protocol like H.248/Megaco or MSML, for example. If the conference controller restarts due to some catastrophic event, then currently the following set of events occur: (i) all of the call dialog information on the conference controller is lost; (ii) once the conference controller comes back up, the media gateways register back to the conference controller and the call context information for all the calls on that media gateway are provided to the conference controller. However, the media path in the conference call is maintained but the call is never re-established. That is, the call stays in a connection preservation mode for example. Accordingly, features like adding a new participant, transferring a participant, and placing a participant on hold, etc. will not work in the conference call anymore.

Accordingly, and in accordance with embodiments of the present disclosure, when a conference call is established, the conference controller sends a Unique Session ID (this could be the SIP Global Session ID) per ephemeral (per-SIP UA) to the media gateway, along with a Unique Conference ID for the whole Conference. Therefore, if the call is on multiple media gateways (with an Inter Gateway Connection between them), then the same Unique Conference ID is sent to all the terminations on each of those media gateways. Now, if the conference controller restarts due to a catastrophic event, then all the call data is lost on the controller and the media gateways during re-registration will send all the contexts with the Unique Conference and Session IDs to the conference controller. In addition to sending the Unique Session ID and the Unique Conference ID to the media gateway, the conference controller may also send other feature and/or policy information to the media gateway. Examples of other feature and/or policy information include, but are not limited to, feature states and button states. Accordingly, following a conference controller restart or other catastrophic failure, the media gateway may provide such additional feature and policy information to the conference controller. Upon receiving such additional information, the conference controller may recover such feature and/or policy states.

Following the transfer of such information, the conference controller sends an Out-of-Dialog REFER, which can also be referred to as an OOD-REFER, to each of the conference participants. The Out-of-Dialog REFER contains R-URI, which is the Unique Conference ID, and a separate header for the Unique Session ID for that specific SIP UA (received from the media gateway). The SIP UA upon receiving the Out-of-Dialog REFER identifies that the OOD-REFER is for call reconstruction (denoted by a tag in R-URI), and using the Unique Session ID, the SIP UA identifies the call on itself that has to be reconstructed. That is, the SIP UA identifies the call from the call state information based on the Unique Session ID. The SIP UA then sends a new INVITE message to the R-URI it received with its media parameters and the conference controller upon receiving the INVITE from the SIP UA identifies the ephemeral it is associated to and links them together. Accordingly, the SIP UA, after receiving the 200-OK response from the conference controller, drops the old call with a BYE. The conference controller then repeats this set of actions for all the SIP UAs in the conference call.

In accordance with at least some embodiments of the present disclosure, a method of managing a Session Initiation Protocol (SIP) dialog between a network element and a conference controller is provided. The method may include determining that a signaling-disrupting event has occurred during a SIP conference call, and reestablishing the SIP dialog between the network element and the conference controller.

In accordance with at least some embodiment of the present disclosure, a system is provided, the system comprising: a conference controller including: a processor; and memory including one or more instructions that when executed by the processor, enable the conference controller to: determine that a signaling-disrupting event has occurred during a Session Initiation Protocol (SIP) conference call; and reestablish a SIP dialog between a network element and the conference controller.

Further yet, and in accordance with at least some embodiment of the present discourse, a non-transitory computer readable medium having stored thereon instructions that cause a processor to execute a method is provided, the method comprising one or more instructions to establish a Session Initiation Protocol (SIP) dialog between a SIP user agent and a conference controller; one or more instructions to determine that a signaling-disrupting event has occurred during a SIP conference call having the established SIP dialog; and one or more instructions to reestablish the SIP dialog between the SIP user agent and the conference controller.

Accordingly, it is these and other advantages that will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that an individual aspect of the invention can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The disclosure herein is illustrated below in conjunction with an exemplary communication system. Although well suited for use with a system using a server(s) and/or database(s), for example, the embodiments of the disclosure are not limited to a use with any particular type of communication system or configuration of system elements. Those skilled in the art will recognize that the disclosed techniques may be used in any communication application in which it is desirable to reconstruct a Session Initiation Protocol (SIP) dialog.

The exemplary systems and methods of this invention will also be described in relation to analysis software, modules, and associated analysis hardware. However, to avoid unnecessarily obscuring the present invention, the following description omits well-known structures, components, and devices that may be shown in block diagram form or are otherwise summarized.

Figure 1:
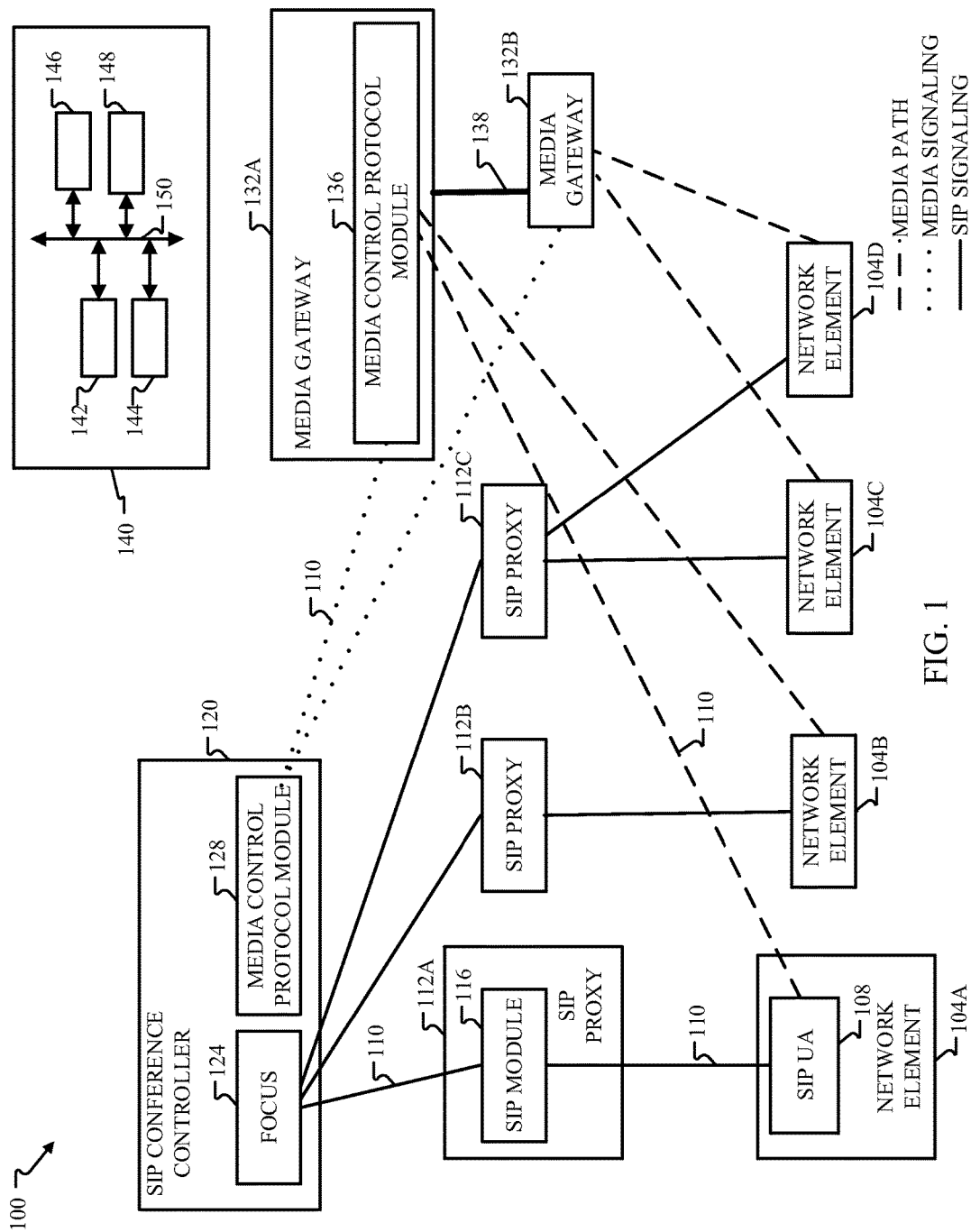
FIG. 1 depicts a first communication system for reconstructing a Session Initiation Protocol (SIP) dialog in accordance with at least some embodiments of the present disclosure.

FIG. 1 depicts an illustrative communication system 100 for reconstructing a Session Initiation Protocol (SIP) dialog in accordance with at least some embodiments of the present disclosure. The system 100 includes one or more network elements 104A-104D, one or more SIP proxies 112A-112C, at least one SIP server 120, and one or more media gateways 132A-132B. Each of the one or more network elements 104A-104D, one or more SIP proxies 112A-112C, at least one SIP server 120, and one or more media gateways 132A-132B may be the same as or similar to node 140 that typically includes a processor 142, memory 144, an input/output (I/O) subsystem 146, and one or more hardware units/modules 148 coupled to a system bus 150. Of course, in embodiments where components may share the same physical hardware, each of the one or more network elements 104A-104D, one or more SIP proxies 112A-112C, at least one SIP server 120, and one or more media gateways 132A-132B may rely on a processor 142 (e.g., a microprocessor), computer memory 144, an input/output (I/O) subsystem 146, and one or more hardware units/modules 148.

Each of the network elements 104 may include but are not limited to, end-user devices (e.g., phones, cell phones, mobile communication devices, soft-client applications running on a Personal Computer (PC) or similar type of work station and connected to a phone, etc.) and applications running on a server or the like (e.g., conferencing application(s) running on a conferencing server, messaging application(s) running on a messaging server, voice portal, etc.) and may communicate with at least one of the SIP proxy 112, media gateway 132, and SIP server 120 over one or more networks 110. In accordance with embodiments of the present disclosure, four network elements 104A-104D are illustrated; however, any number of network elements 104 may be connected to the network 110. While certain embodiments of the present invention will be discussed in connection with exemplary network elements, one skilled in the art will appreciate that embodiments of the present invention are not so limited.

Each of the network elements 104A-104D may include a SIP UA 108. The SIP UA 108 may be any hardware/software that can process SIP communications such as a SIP telephone application, a SIP Instant Messaging (IM) application, a SIP video conference application, a SIP email application, a SIP softphone in a PC, a SIP application in a set-top box, and the like. That is, the SIP UA 108 may be a component of the SIP network element 104 that facilitates SIP UA behavior and implements SIP call control features on behalf of the SIP network element 104. In accordance with at least some embodiments of the present invention, the SIP UA 108 is the component of the network element 104 that is capable of exchanging (e.g., generating, receiving, and/or processing) SIP messages with other network elements 104, SIP proxies 112, and/or the SIP server 120. Exemplary SIP messages that may be generated, received, and/or processed by the SIP UA 108 include, without limitation, INVITE, ACK, OK, BYE, and any other known SIP message, such as those described in IETF RFC 3261, the entire contents of which are hereby incorporated herein by reference, and such other IETF RFC's that extend the message functionality of SIP. The SIP UA 108 may communicate with the SIP proxy 112, the SIP server 120, the media gateway 132, and/or another SIP UA 108. Further, the network element 104 may also include a processor 142 for executing instructions stored in memory 144, thereby performing the functions provided by the network element 104 and the SIP UA 108.

The network 110 may be any network that can send and receive information, such as the Internet, a Wide Area Network (WAN), a Local Area Network (LAN), the Public Switched Telephone Network (PSTN), a packet switched network, a circuit switched network, a cellular network, any combination of these, and the like. The network 110 may use a variety of protocols, such as Ethernet, Internet Protocol (IP), Session Initiation Protocol (SIP), Asynchronous Transfer Mode (ATM), Integrated Services Digital Network (ISDN), H.323, and the like.

While SIP UAs 108 may communicate directly without any additional SIP intermediaries, from a practical standpoint SIP servers, such as SIP proxy 112 and SIP conference controller 120, are utilized to facilitate end-to-end communication when utilizing SIP as a public service. A proxy server, as defined by RFC 3261, is an intermediary entity that acts as both a server and a client for the purpose of making requests on behalf of other clients. A proxy server primarily plays the role of routing, which means its job is to ensure that a request is sent to another entity "closer" to the targeted user. Proxies are also useful for enforcing policy (for example, making sure a user is allowed to make a call). A proxy interprets and, if necessary, rewrites specific parts of a request message before forwarding it. That is, the SIP proxy 112 may manage the setup of calls between SIP devices, such as network elements 104, including the controlling of call routing. Further, the SIP proxy 112 may perform necessary functions such as registration, authorization, network access control and, in some cases, network security. The SIP proxy 112 may include one or more processors 142 or memories 144 and be distributed across multiple devices on network 110.

The SIP proxy 112 may also include a SIP module 116. The SIP module 116 may be any hardware/software that can process SIP messages. In some embodiments, the SIP module 116 is the SIP proxy server 112. In other embodiments, the SIP module 116 is a Back-to-Back User Agent (B2BUA). In still other embodiments, the SIP module 116 may comprise both a SIP proxy server 112 and a B2BUA. The SIP proxy server 112 and the B2BUA may reside in separate SIP modules 116 that reside on different devices in different networks 110. Although there is only a single SIP module 116 illustrated in FIG. 1, each of the SIP Proxies 112A-112C may include a SIP module 116. The SIP proxy 112 may also include a processor 142 for executing instructions stored in memory 144, thereby performing the functions provided by the SIP proxy 112, and the SIP module 116.

In accordance with embodiments of the present disclosure, the SIP module 116 is configured to establish a SIP dialog between the SIP UA 108 and the SIP conference controller 120 using standard SIP processes. In addition, other SIP UAs 108 may be involved in the SIP dialog. For example, more than two SIP UAs 108 may be involved in a video conference or voice conference utilizing SIP conference controller 120 as a conference server.

As previously discussed, the network element 104 may be participating in a conference where the SIP conference controller 120 manages or otherwise facilitates the conference. That is, the SIP conference server 120 may be a physical server that contains, at a minimum, a focus in accordance with IETF RFC 4353, the entire contents of which are hereby incorporated herein by reference for all that it teaches and for all purposes. In a tightly coupled conference, a single UA, referred to as a focus, such as focus 124, maintains a dialog with each participant in the conference, such as each network element 104 and each SIP proxy 112. The focus 124 plays the role of the centralized manager of the conference, and may be addressed by a conference Uniform Resource Indictor (URI). That is, the focus 124 maintains a SIP signaling relationship with each participant in the conference and is responsible for ensuring, in some way, that each participant receives the media that make up the conference. The focus also implements conference policies.

The SIP conference controller 120 may also include a media control protocol module 128. Such a media control module 128 may be the same as or similar to a media gateway controller that manages call control protocols, or signaling, between the SIP conference controller 120 and the media gateway 132. The SIP conference controller 120, via the media control protocol module 128, may communicate with the media gateway 132 using a media signaling protocol, such as, but not limited to H.248/MEGACO and media server markup language (MSML). The SIP conference controller 120 may also include a processor 142 for executing instructions stored in memory 144, thereby performing the functions provided by the SIP conference controller 120, the focus 124, and the media control protocol module 128.

In accordance with embodiments of the present disclosure, the media gateway 132 may comprise a platform for executing real-time media processing tasks. That is, the media gateway 132 may be a logical function that maps either to a single physical device or to a portion of a physical device and converts media provided in one type of network to the format required in another type of network. Further, the media gateway 132 may be capable of processing audio and video, alone, or in any combination. The media gateway 132 may also play audio/video messages and perform other Interactive Voice Response (IVR) functions, or may perform media conferencing, for example, by providing media to one or more network elements 104 in accordance with one or more protocols, such as Real-time Transport Protocol and/or the RTP Control Protocol (RTCP). Alternatively, or in addition, the media gateway 132 may include a media control protocol module 136 that is different than the media control protocol module 128. That is, the media control protocol module 136 may be responsible for converting media provided in one type of network to the format required in another type of network and for communicating with the media control protocol module 128 and each of the SIP UAs 108 of the respective network elements 104. In some embodiments, multiple media gateways 132A-132B may be connected by an Inner Gateway Connection 138. Like the network element 104, the SIP proxy 112, and the SIP conference controller 120, the media gateway 132 may also include a processor 142 for executing instructions stored in memory 144, thereby performing the functions provided by the media gateway 132 and media control protocol module 136.

As will be discussed below, once a SIP dialog between one or more SIP UAs 108 and/or the SIP conference controller 120 is established, a media session may be directly established between the SIP UAs 108 whereby media may be delivered via the media gateway 132. For example, a voice or video media stream may be established between SIP UAs 108 and the media gateway 132 using Real Time Protocol (RTP). At some point, the SIP conference controller 120 may experience one or more outages or catastrophic events such that the SIP conference controller 120 restarts. This may be for various reasons, such as, a hardware failure, a software failure, a firmware failure, a power failure, a network failure, and/or the like. As a result, all call dialog information that once resided on the SIP conference server 120 is lost.

In comparative examples, once the SIP conference controller 120 comes back online after experiencing such an event, the one or more media gateways 132 register back to the SIP conference controller 120, providing the SIP conference controller 120 the necessary call context information for all calls that are utilizing the media gateway server 132. However, although the media path between the SIP UA 108 and the media gateway 132, and thus the conference call, may be maintained, the call dialog is never re-established. That is, the call dialog may stay in a preservation mode. Accordingly, features such as adding a new participant, transferring participants, and placing participants on hold are no longer available and will not work even though the media path, and thus the conference call, appear to conference participants as if the communication system 100 has not been impacted by the failure.

In accordance with embodiments of the present disclosure, the call dialog may be reestablished by relying on information generated and provided to the media gateway 132 during the call setup process. That is, referring to FIG. 2, additional details of the communication system 100 are provided as communication system 200 in accordance with embodiments of the present disclosure. The communication system 200 may include the same or similar components as that of communication system 100 in FIG. 1. Accordingly, for purposes of clarity, descriptions of components having the same reference character have been omitted. During a conference call setup or establishment process, the network element 104, via the SIP UA 108, may initiate a conference call utilizing the SIP conference controller 120. Accordingly, the SIP UA 108 may generate an INVITE message together with the Session Description Protocol (SDP) data describing the media attributes that the requester desires for the call. Such an INVITE message may be provided to the SIP module 116 via the SIP proxy 112. In accordance with embodiments of the present disclosure, the SIP proxy 112 provides the INVITE message and SDP offer from the SIP UA 108 to the SIP conference controller 120. That is, the SDP offer from the SIP UA 108 may be mapped for H.238/MSML interoperability purposes by an SDP mapper residing between the SIP module 124 and the media control protocol module 128. Accordingly, the media control protocol module 128 may generate an ephemeral termination and context, if none exists, by requesting an Add (Request). In accordance with embodiments of the present disclosure, for the ephemeral termination, the media control protocol module 128 specifies few SDP parameters in the local and remote descriptors. That is, the local and remote descriptors may be under-specified. In under-specifying the local and remote descriptors, the media gateway 132 assigns values for the local descriptor on its own.

Figure 2:
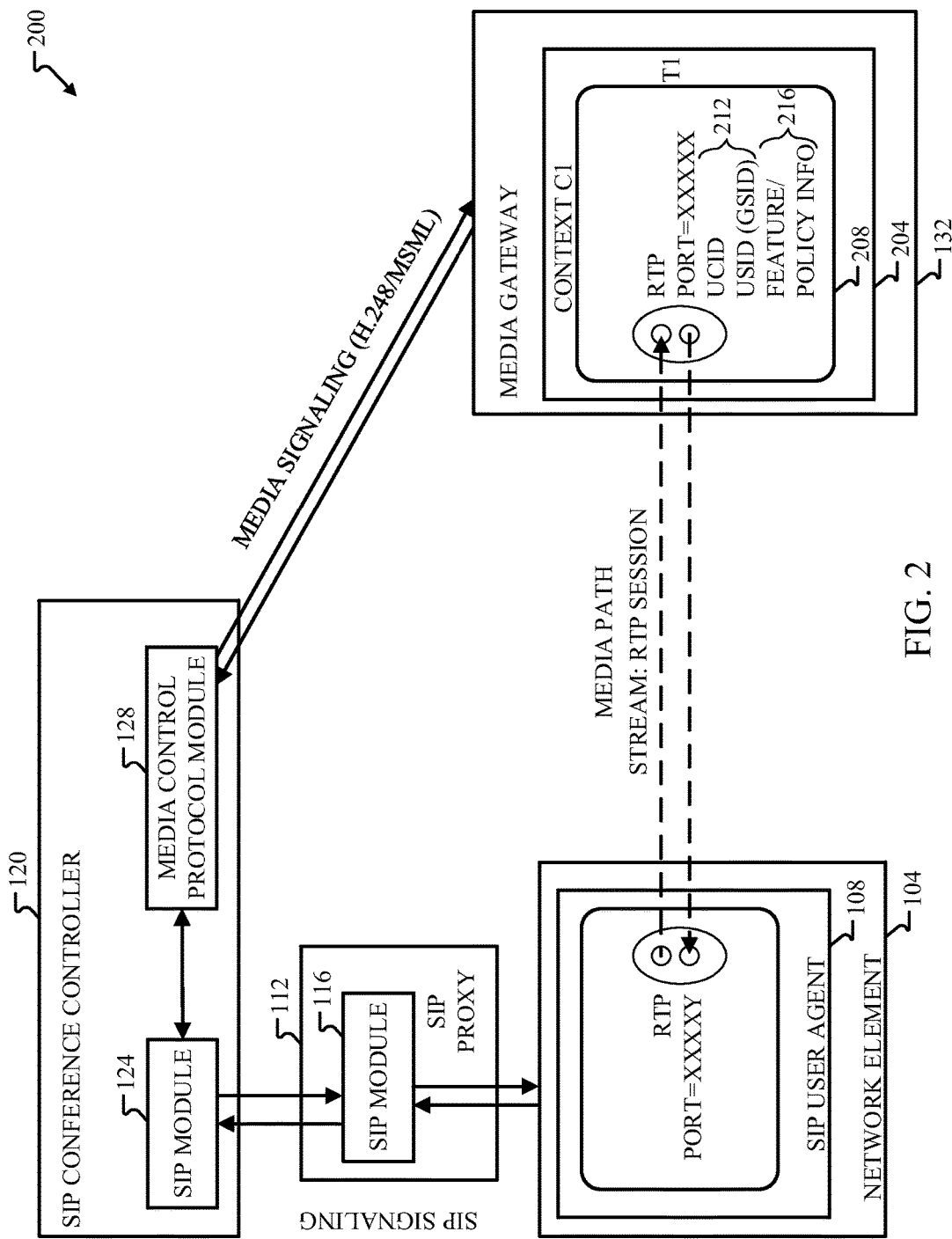
FIG. 2 depicts additional details of the communication system 100 in accordance with embodiments of the present invention.

That is, in a response message to the SIP conference controller 120, the local descriptors (e.g., the descriptors dealing primarily with the media flowing into the media gateway 132) may be over-specified, as the media gateway 132 may operate in accordance with a multitude of capabilities. Accordingly, the response message to the SIP conference controller 120 from the media gateway 132 may include an allocated context, such as context 204, which consists of a list of common codecs, the local IP address of the media gateway 132, and ephemeral termination information 208 including an RTP port. The SIP conference controller 120, now having local descriptor information for the media gateway 132, may issue a modify request message to modify the termination information 208 using a termination ID and/or context ID, for example. The modify request may include specified remote and local descriptor information, as well as another property for the termination 208. That is, the modify request sent by the SIP conference controller 120 may add the Conference ID property and the Unique Session ID (e.g., GSID) 212 for the ephemeral termination 208. In addition to sending the Unique Session ID and the Unique Conference ID 212, the modify request may also include other feature and/or policy information 216. Examples of other feature and/or policy information 216 include, but are not limited to, feature states and button states that the SIP conference controller 120 may recover following a restart or other catastrophic failure. As the Unique Session ID is unique per ephemeral session, the Unique Session ID provides the ability for a SIP UA 108 to look up call information for a currently working media path based on such a Unique Session ID. Accordingly, the media gateway address and the Unique Session ID may be provided in a corresponding response message (e.g., an SDP response) from the media gateway 132 and/or the SIP conference controller 120 when reconstructing a SIP dialog. In accordance with embodiments of the present disclosure, assuming the SIP UA 108 acknowledges the OK message sent from the SIP conference controller 120 via the SIP Proxy 112, a media path based on the local and remote descriptors may be established between the SIP UA 108 and the media gateway 132 as illustrated in FIG. 2. Accordingly, such a process may be completed for each SIP UA 108 participating in a conference call, where each SIP UA 108 utilizes a Unique Session ID but shares the Unique Conference ID.

Upon a SIP conference controller 120 restart, the SIP conference controller 120 loses all call dialog information. Accordingly, the media gateway 132 may re-register with the SIP conference controller 120 and generate a Notify request including the Unique Session ID, the Unique Conference ID, and the remote and local descriptors for ephemeral termination 208. That is, the media gateway 132 provides a full list of call and conference contexts currently in its possession to the SIP conference controller 120. Moreover, the media gateway 132 may also provide the previously stored feature and/or policy information, in addition to the Unique Session ID, the Unique Conference ID, and the remote and local descriptors. Accordingly, the SIP conference controller 120, based on the existence of connections with ephemeral terminations 208, initiates the reconstruction of the SIP dialog. Similarly, the SIP conference controller 120 may initiate the reconstruction of the feature and/or policy information as well.

Upon a SIP conference controller 120 failure such that the SIP conference controller 120 is unable to restart or otherwise is out of commission, a different and/or new SIP conference controller, such as a standby server in the same or different geographic location, may come online and fulfill the roll of the previous SIP conference controller 120. Accordingly, the media gateway 132 may register with the new SIP conference controller and generate a Notify request including the Unique Session ID, the Unique Conference ID, and the remote and local descriptors for ephemeral termination 208. That is, the media gateway 132 provides a full list of call and conference contexts currently in its possession to the new SIP conference controller. Moreover, the media gateway 132 may also provide the previously stored feature and/or policy information, in addition to the Unique Session ID, the Unique Conference ID, and the remote and local descriptors. Accordingly, the new SIP conference controller, based on the existence of connections with ephemeral terminations 208, initiates the reconstruction of the SIP dialog. Similarly, the new SIP conference controller may initiate the reconstruction of the feature and/or policy information as well.

Alternatively, or in addition, upon a SIP conference controller 120 restart or other catastrophic event, the SIP conference controller 120 loses all call dialog information. Accordingly, the media gateway 132 may re-register with the SIP conference controller 120 generating a Service Change and subsequently an Audit message to allow the SIP conference controller 120, more specifically, the media control protocol module 128, to synchronize its state with the media gateway 132. Upon the media gateway 132 providing a full list of call and conference contexts currently in its possession to the SIP Conference Controller 120, the SIP conference controller, based on the existence of connections with ephemeral terminations 208, initiates the reconstruction of the SIP dialog.

During the SIP dialog reconstruction process, the SIP conference controller 120 typically generates an Out-of-Dialog REFER message wherein the R-URI is the Unique Conference ID that was received from the media gateway 132. A separate header of the Out-of-Dialog REFER message may include the Unique Session ID for the specific SIP UA 108. That is, upon receiving the Out-of-Dialog REFER message, the SIP UA 108 will identify the REFER message as a reconstruction. Accordingly, using the Unique Session ID, the SIP UA 108 may identify the call in process having a termination with the specific Unique Session ID. Upon identifying such call from the call state information maintained at the SIP UA 108, for example, the SIP UA 108 initiates a new INVITE message for a new dialog, where the SDP offer is the same as the initial dialog. The new INVITE message is sent to the R-URI received with the media parameters received from the SIP conference controller 120. Upon receiving the new INVITE message from the SIP UA 108, the SIP conference controller 120 identifies that the INVITE message is associated to the SIP UA 108 and links them together. Upon receiving an OK from the SIP conference controller 120, the SIP UA 108 proceeds to drop the initial dialog by issuing a BYE. The SIP conference controller 120 performs a similar process for other SIP UAs participating in the conference call. That is, the SIP conference controller 120 will send a similar REFER message with the R-URI as the conference ID and a separate header for the Unique Session ID specific to the SIP UA. Accordingly, upon completing the reconstruction process for the other SIP UAs participating in the conference call, and upon reconstructing feature and/or policy information if provided, the reconstruction of the SIP dialog is complete.

Figure 3:
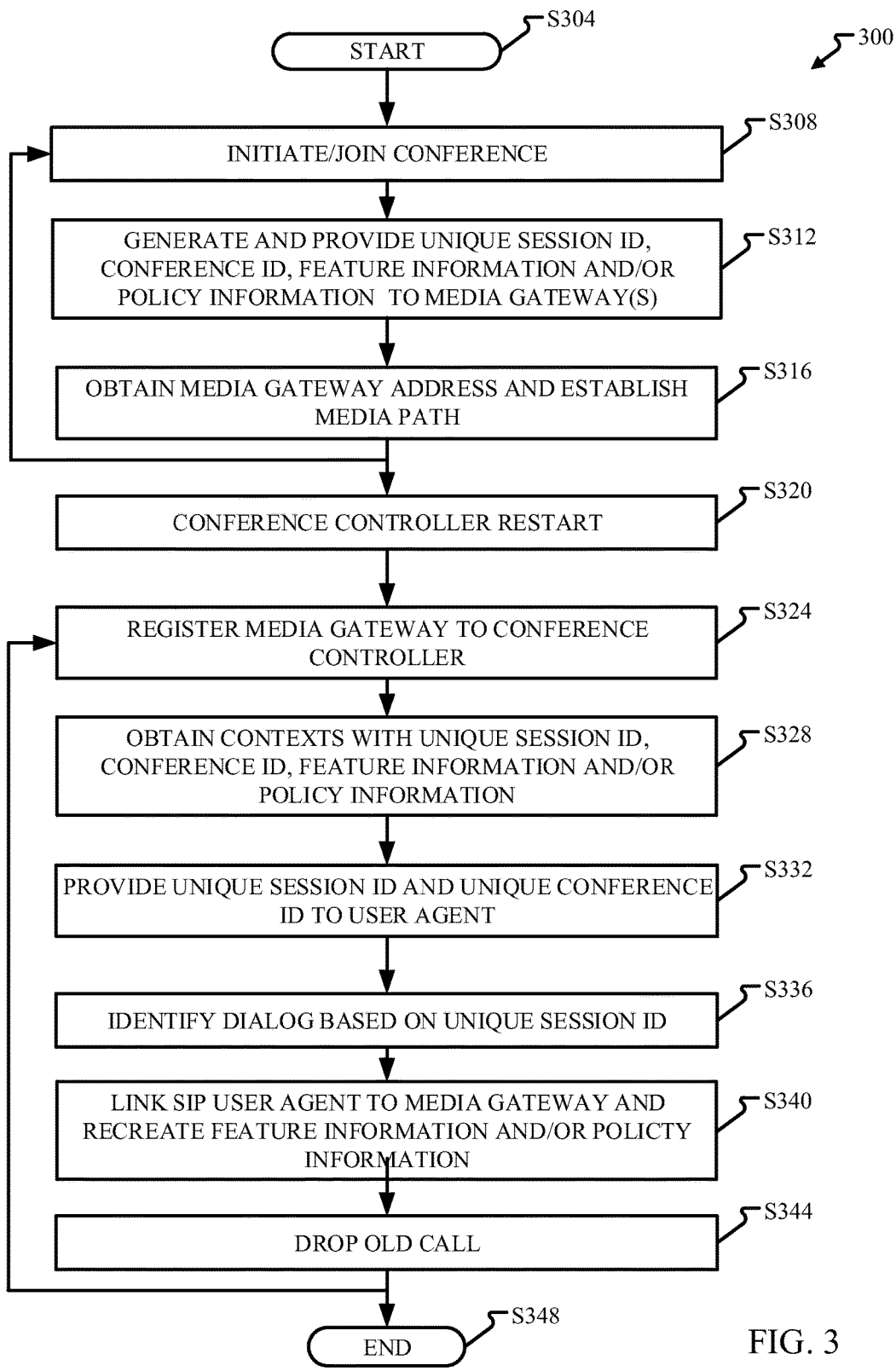
FIG. 3 generally depicts a method for reconstructing a SIP dialog in accordance with embodiments of the present disclosure.

Referring now to FIG. 3, a method 300 for reconstructing a SIP dialog is described in accordance with embodiments of the present disclosure. Method 300 is, in embodiments, performed by one or more devices, such as the one or more devices included in the system 100 and system 200. More specifically, one or more hardware and software components including the SIP UA 108 of a respective network element 104, the SIP proxy server 112, the SIP conference controller 120, and the media gateway 132 may be involved in performing method 300. In one embodiment, one or more of the previously described modules and/or devices perform one or more of the steps of method 300. The method 300 may be executed as a set of computer-executable instructions, executed by one or more of the previously described SIP UA 108 of a respective network element 104, SIP proxy server 112, SIP conference controller 120, and media gateway 132, encoded or stored on a computer-readable medium. Hereinafter, the method 300 shall be explained with reference to systems, components, modules, software, etc. described with respect to FIGS. 1 and 2.

Method 300 may continuously flow in a loop, flow according to a timed event, or flow according to a change in an operating or status parameter. Method 300 is initiated at step S304 where a first participant may wish to establish or initiate a phone conference. Accordingly, at step S308, the network element 104, via the SIP UA 108, may initiate a conference call utilizing the SIP conference controller 120. Accordingly, the SIP UA 108 may generate an INVITE message together with the Session Description Protocol (SDP) data describing the media attributes that the requester desires for the call. Such an INVITE message may be provided to the SPI module 116 via the SIP proxy 112. At step S312, and in accordance with embodiments of the present disclosure, the SIP proxy 112 provides the INVITE message and SDP offer from the SIP user agent 108 to the SIP conference controller 120. At least one of the SIP proxy 112 and/or the SIP conference controller 120 generates a Unique Session ID and a Unique Conference ID, where the Unique Session ID is specific to at least one termination 208 within the media gateway 132. At step S312, the Unique Session ID and the Unique Conference ID may be stored at the media gateway 132. In addition to the Unique Session ID and the Unique Conference ID being stored at the media gateway 132, other feature and/or policy information, such as, but are not limited to, feature states and button states, may be stored at the media gateway 132. The media gateway address may be provided to the SIP UA 108 at step S316. Further, at step S316, a media path between the media gateway 132 and the SIP UA 108 may be established such that media (e.g., voice, video etc.) is provided via the media path.

Upon a SIP conference controller 120 restart at step S320, the SIP conference controller 120 loses all call dialog information. Accordingly, the media gateway 132 may re-register with the SIP conference controller 120 at step S324 and provide the SIP conference controller 120 the Unique Session ID, the Unique Conference ID, and context information with respect to the media path(s) established between the media gateway 132 and one or more SIP UAs 108 at step S328. In addition to providing the Unique Session ID and the Unique Conference ID to the SIP conference controller 120, the media gateway 132 may also send the previously stored feature and/or policy information at step S328. The Unique Session ID and the Unique Conference ID may then be provided to the SIP UA 108 at step S332 using an Out-of-Dialog REFER message having the R-URI set as the Unique Conference ID. The previous call dialog to be reconstructed may be identified based on the Unique Session ID at step S336. At step S340, a link between the SIP UA 108 and the SIP conference controller 120 may be made based on the following: (i) information in the new INVITE message having the same SDP offer as the one from the initial dialog, and (ii) existing local descriptor information from the media gateway 132. Further, at step S340, the feature information and/or policy information received from the media gateway 132 may be reconstructed. At step S344, the SIP UA 108 may drop the old call dialog based on the Call-ID with a BYE message. Accordingly, the SIP call dialog is reconstructed for a specific SIP UA 108 and the process 300 may end at step S348. It should be noted that following step S316, the steps S308-S316 may be repeated for each of the UAs participating or otherwise involved in a conference call. Moreover, upon a SIP conference controller 120 restart at step S320, steps S324-S344 may be repeated for each of the UAs participating or otherwise involved in a conference call.

Figure 4:
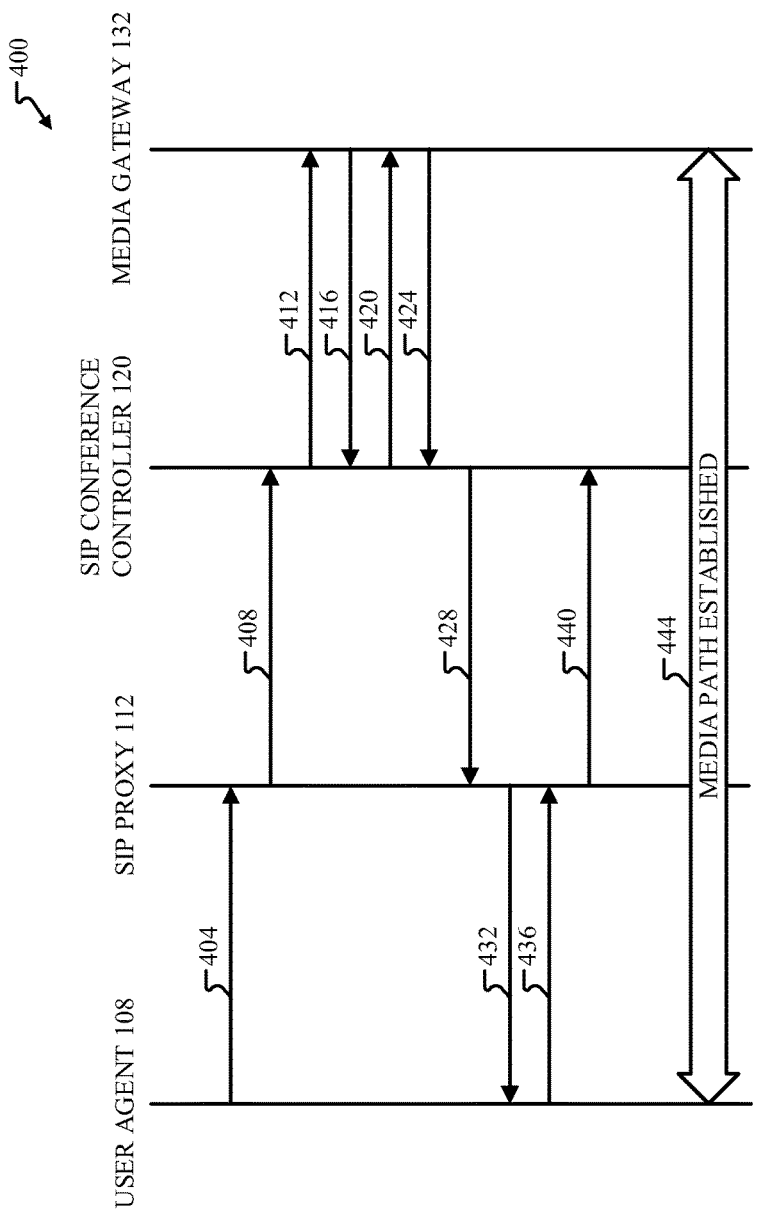
FIG. 4 is a flow diagram of a method for establishing a SIP dialog between a SIP user agent and a SIP conference controller in accordance with embodiments of the present disclosure.

Referring now to FIG. 4, a flow diagram of a method for establishing a SIP dialog between a SIP UA 108 and a SIP conference controller 120 is illustrated. In accordance with embodiments of the present disclosure, the SIP UA 108 of a respective network element 104, the SIP proxy server 112, the SIP conference controller 120, and the media gateway 132 are stored-program-controlled entities, such as a computer or processor, which perform the method of FIG. 4 and the processes described herein by executing program instructions stored in a tangible computer-readable storage medium, such as a memory or disk. Although the method described in FIG. 4 is illustrated in a specific order, one of skill in the art would recognize that the steps in FIG. 4 may be implemented in a different order and/or be implemented in a multi-threaded environment. Moreover, various steps may be omitted or added based on implementation.

FIG. 4 depicts a call setup or establishment process 400 in which the network element 104, via the SIP UA 108, may initiate a conference call utilizing the SIP conference controller 120 at step 404. Accordingly, the SIP UA 108 may generate an INVITE message together with SDP data describing the media attributes that the requester desires for the call at step 404. Such an INVITE message, together with the SDP offer, may be provided to the SIP proxy 112 at step 404. In accordance with embodiments of the present disclosure, the SIP proxy 112 provides the INVITE message and SDP offer received from the SIP UA 108 to the SIP conference controller 120 at step 408. At least one of the SIP proxy 112 and the SIP conference controller 120 generate a Unique Session ID, where the Unique Session ID is generated per ephemeral (per SIP UA) at step 408. In accordance with some embodiments of the present disclosure, the Unique Session ID may be the same as or similar to the Global Session ID. A Global Session ID may be generated in accordance with the procedures outlined in U.S. application Ser. No. 13/626,066, the entire contents of which are herein incorporated by reference for all that it teaches and for all purposes. Alternatively, or in addition, the media control protocol module 128 may cause the media gateway 132 to generate an ephemeral termination 208 and context, if none exists, by requesting an Add (Request) at step 412. In accordance with embodiments of the present disclosure, for the ephemeral termination 208, the media control protocol module 128 specifies few SDP parameters in the local and remote descriptors. That is, the local and remote descriptors may be under-specified. In under-specifying the local and remote descriptors, the media gateway 132 assigns values for the local descriptor on its own.

That is, in a response message to the SIP conference controller 120 at step 416, the local descriptors (e.g., the descriptors dealing primarily with the media flowing into the media gateway 132) may be over-specified, as the media gateway 132 may operate in accordance with a multitude of capabilities. Accordingly, the response message to the SIP conference controller 120 from the media gateway 132 at step 416 may include an allocated context, such as context 204, which consists of a list of common codecs, the local IP address of the media gateway 132, and ephemeral termination information 208 including an RTP port. The SIP conference controller 120, now having local descriptor information for the media gateway 132, may issue a modify request message to modify the termination information 208 using a termination ID and/or context ID for example at step 420. The modify request may include specified remote and local descriptor information, as well as another property for the termination 208. That is, the modify request sent by the SIP conference controller 120 at step 420 may add the Conference ID property and the Unique Session ID (e.g., GSID) for the ephemeral termination 208. As the Unique Session ID is unique per ephemeral session, the Unique Session ID provides the ability for a SIP UA 108 to look up call information for a currently working media path based on such a Unique Session ID. In addition to sending the Unique Session ID and the Unique Conference ID, the modify request may also include other feature and/or policy information. Examples of other feature and/or policy information include, but are not limited to, feature states and button states that the SIP conference controller 120 may recover following a restart or other catastrophic failure. The media gateway 132 may provide a Modify response at step 424. Accordingly, the media gateway address and the Unique Session ID may be provided in a 200 OK message from the SIP conference controller 120 to the SIP proxy 112 at step S428. Such a 200 OK message may include an SDP response from the SIP conference controller 120. Further, the media gateway address and the Unique Session ID may be provided from the SIP proxy 112 to the SIP UA 108 at step 432. An ACK message from the SIP UA 108 is provided to the SIP proxy 112 at step 436, and a subsequent ACK message from the SIP proxy 112 is provided to the SIP conference controller 120 at step S440. Accordingly, a media path 444 based on the local and remote descriptors may be established between the SIP UA 108 and the media gateway 132 as illustrated in FIG. 2. Accordingly, such a process 400 may be completed for each SIP UA 108 participating in a conference call, where each SIP UA 108 utilizes a Unique Session ID but shares the Unique Conference ID. Moreover, in instances where the conference call spans two or more media gateways 132, the same Unique Conference ID is sent to all terminations 208 on each of the media gateways 132.

Figure 5:
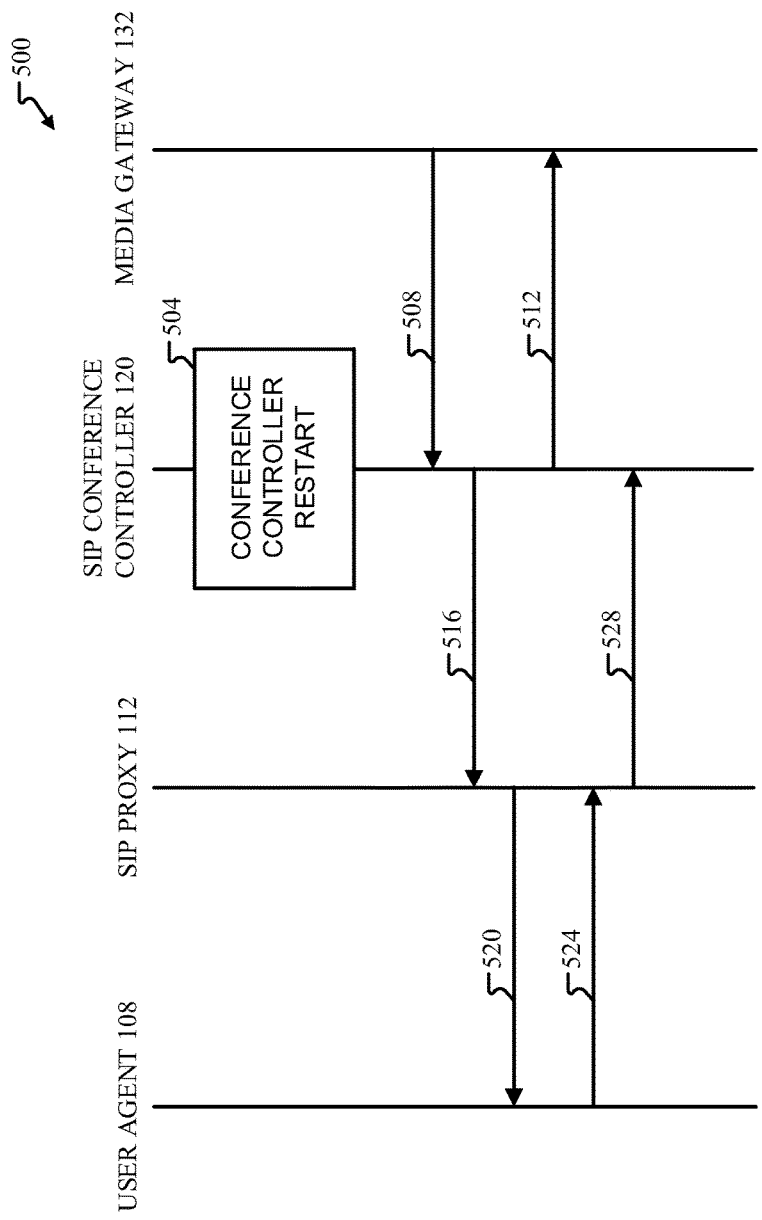
FIG. 5 depicts a flow diagram of a method generally directed to specific actions of a media gateway and SIP conference controller for reconstructing a SIP dialog following a reboot of the SIP conference controller in accordance with embodiments of the present disclosure.

FIG. 5 is a flow diagram directed to a method 500 generally specific to media gateway 132 and SIP conference controller 120 actions for reconstructing a conference call for a single SIP UA 108 following a reboot of the SIP conference controller 120. In accordance with embodiments of the present disclosure, the SIP UA 108 of a respective network element 104, the SIP proxy server 112, the SIP conference controller 120, and the media gateway 132 are stored-program-controlled entities, such as a computer or processor, which perform the method of FIG. 5 and the processes described herein by executing program instructions stored in a tangible computer-readable storage medium, such as a memory or disk. Although the method described in FIG. 5 is illustrated in a specific order, one of skill in the art would recognize that the steps in FIG. 5 may be implemented in a different order and/or be implemented in a multi-threaded environment. Moreover, various steps may be omitted or added based on implementation.

FIG. 5 depicts a conference call reconstruction process generally specific to the actions of the media gateway 132 and the SIP conference controller 120. Upon a SIP conference controller 120 restart at step 504, the SIP conference controller 120 loses all call dialog information. Accordingly, the media gateway 132 may re-register with the SIP conference controller 120 and generate a Notify request including the Unique Session ID, the Unique Conference ID, and the remote and local descriptors for ephemeral termination 208 at step 508. That is, the media gateway 132 provides a full list of call and conference contexts currently in its possession to the SIP conference controller 120. Moreover, the media gateway 132 may also provide the previously stored feature and/or policy information, in addition to the Unique Session ID, the Unique Conference ID, and the remote and local descriptors at step 508 to the SIP conference controller 120. The SIP conference controller 120 may send a Notify response to the media gateway 132 at step 512.

The SIP conference controller 120, based on the existence of connections with ephemeral terminations 208, initiates the reconstruction of the SIP dialog at step 516. That is, during the SIP dialog reconstruction process, the SIP conference controller 120 typically generates an Out-of-Dialog REFER message at step 516. The R-URI is the Unique Conference ID that was received from the media gateway 132 at step 508. A separate header of the Out-of-Dialog REFER message may include the Unique Session ID for the specific SIP UA 108. The REFER message with separate header for the Unique Session ID for the specific SIP UA 108 will be received at the SIP proxy 112 from the SIP conference controller 120 at step 516. The SIP proxy 112 then sends the REFER message having the R-URI as the conference ID and the separate header for the Unique Session ID received from the media gateway 132 for the specific SIP UA 108 at step 520. The SIP UA 108 may return a 202 Accepted message to the SIP proxy 112 at step 524, and the SIP proxy 112 may send the corresponding 202 Accepted message to the SIP conference controller 120 at step 528.

Figure 6:
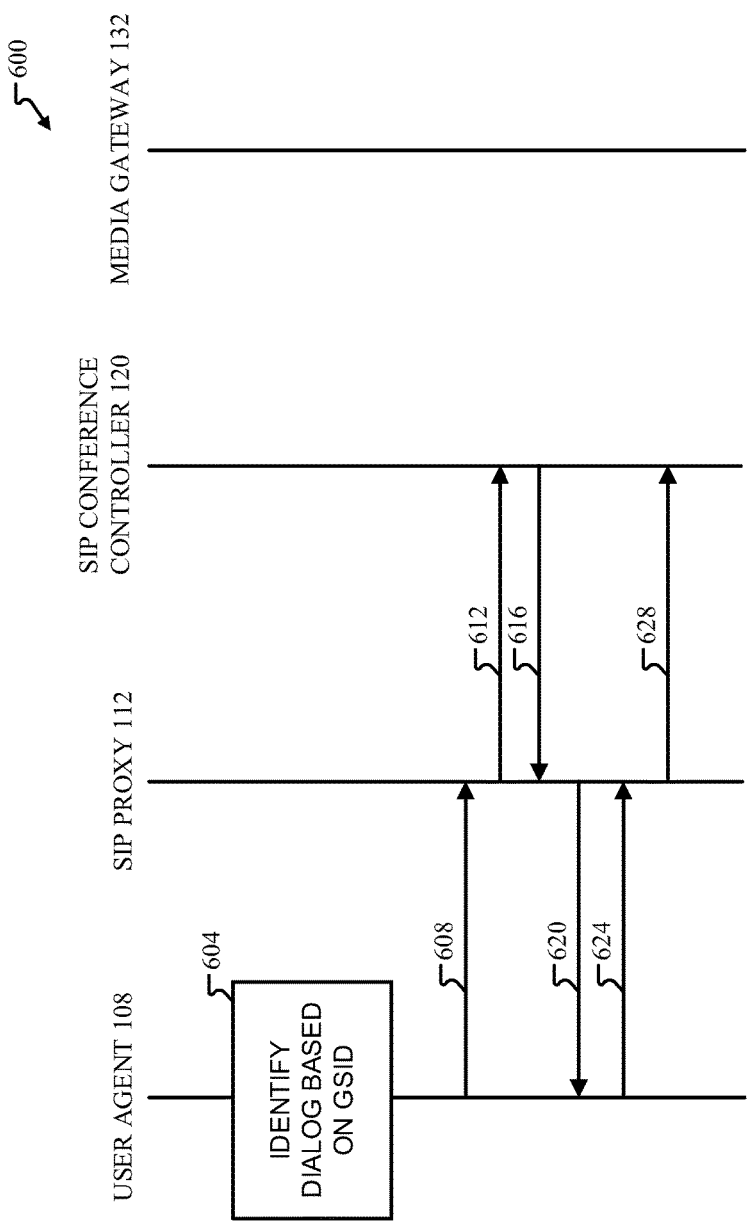
FIG. 6 depicts a flow diagram of a method generally directed to specific actions of a user agent when reconstructing a SIP dialog following a reboot of a SIP conference controller in accordance with embodiments of the present disclosure.

FIG. 6 is a flow diagram directed to a method 600 generally specific to the SIP UA 108 actions for reconstructing a conference call for a single SIP UA 108 following a reboot of the SIP conference controller 120. In accordance with embodiments of the present disclosure, the SIP UA 108 of a respective network element 104, the SIP proxy server 112, and the SIP conference controller 120 are storedprogram-controlled entities, such as a computer or processor, which perform the method of FIG. 6 and the processes described herein by executing program instructions stored in a tangible computer-readable storage medium, such as a memory or disk. Although the method described in FIG. 6 is illustrated in a specific order, one of skill in the art would recognize that the steps in FIG. 6 may be implemented in a different order and/or be implemented in a multi-threaded environment. Moreover, various steps may be omitted or added based on implementation.

FIG. 6 depicts a conference call reconstruction process generally specific to the actions of the SIP UA 108. Upon receiving the Out-of-Dialog REFER message and the Unique Session ID, and/or Global Session ID, at step 520, the SIP UA 108 identifies the REFER message as a reconstruction based on a tag parameter in the Request-URI (R-URI). Accordingly, using the Unique Session ID, the SIP UA 108 may identify the call in process having a termination with the specific Unique Session ID at step 604. That is, the call state information maintained at the SIP UA 108 may be examined to determine if any existing terminations match or otherwise include the Unique Session ID. Upon identifying such call dialog based on the Unique Session ID, the SIP UA 108 initiates a new INVITE message for a new dialog at step 608, where the SDP offer is the same as the offer in the initial dialog of step 404. That is, the new INVITE message is sent to the R-URI received with the media parameters received from the SIP conference controller 120 at step 608. The SIP proxy 112 sends the INVITE message to the R-URI at step 612 with the SDP offer being the same as the initial dialog at step 404. Accordingly, the new INVITE message and the SDP offer are received at the SIP conference controller 120. Upon receiving the INVITE from the SIP UA 108, the SIP conference controller 120 identifies the ephemeral of which the INVITE message is associated to and links the two together in the SIP conference controller 120 context information. At step 616, an OK response, such as a 200 response, containing the SDP answer indicating that such capabilities sent by the media gateway 132 to the SIP conference controller 120 will be used, is sent to the SIP proxy 112. The SIP proxy forwards the 200 OK response with the SDP answer to the SIP UA 108 at step 620. The SIP UA 108 sends an ACK message to the SIP proxy at step 624 and the SIP proxy 112 sends the received ACK message to the SIP conference controller 120 at step 628.

Figure 7:
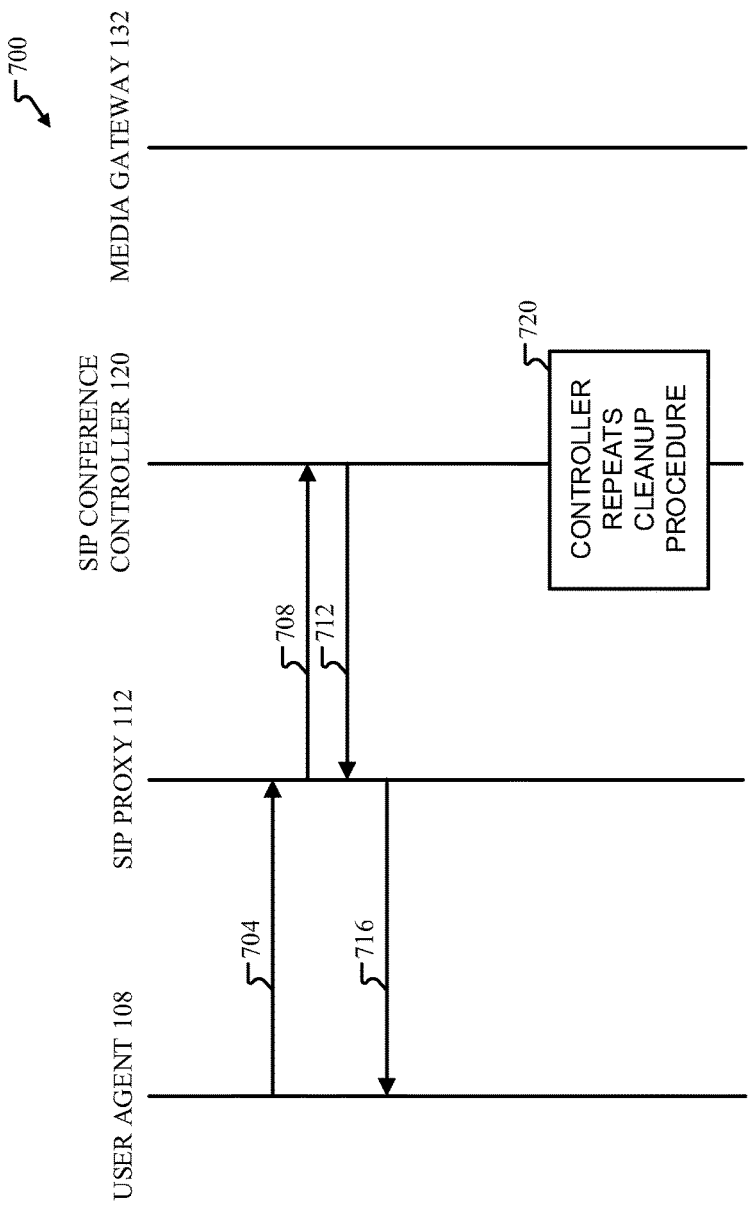
FIG. 7 depicts a flow diagram of a method generally directed to specific actions of a user agent performing SIP dialog cleanup following the reconstructing of a SIP dialog following a reboot of a SIP conference controller in accordance with embodiments of the present disclosure.

FIG. 7 is a flow diagram directed to a method 700 generally specific to the SIP UA 108 and SIP conference controller 120 actions for reconstructing a conference call for a single SIP UA 108 following a reboot of the SIP conference controller 120. In accordance with embodiments of the present disclosure, the SIP UA 108 of a respective network element 104, the SIP proxy server 112, and the SIP conference controller 120 are stored-program-controlled entities, such as a computer or processor, which perform the method of FIG. 7 and the processes described herein by executing program instructions stored in a tangible computer-readable storage medium, such as a memory or disk. Although the method described in FIG. 7 is illustrated in a specific order, one of skill in the art would recognize that the steps in FIG. 7 may be implemented in a different order and/or be implemented in a multi-threaded environment. Moreover, various steps may be omitted or added based on implementation.

FIG. 7 depicts a conference call reconstruction process generally specific to cleanup actions of the SIP UA 108 and the SIP conference controller 120. After receiving the 200 OK response from the SIP conference controller 120 at step 520, the SIP UA 108 sends a BYE request for the initial dialog at step 704. That is, the BYE message terminates the session and the dialog associated with it and may be identified by the Call-ID. Such a BYE message is sent to the SIP conference controller 120 at step 708 where the SIP conference controller 120 terminates the session and the dialog associated with it. At step 712, the SIP conference controller 120 responds with a 200 OK response to the SIP proxy 112; likewise, the SIP proxy 112 forwards the 200 OK response to the SIP UA 108 at step 716. The SIP conference controller 120 performs a similar cleanup process for other SIP UAs 108 participating in the conference call at step 720. That is, the SIP conference controller 120 will send a similar REFER message with the R-URI as the conference ID and a separate header for the Unique Session ID specific to the SIP UA 108. Accordingly, upon completing the reconstruction process for the other SIP UAs 108 participating in the conference call, the reconstruction of the SIP dialog is complete.

In accordance with embodiments of the present disclosure, the network elements 104A-104D were depicted as being connected to the SIP proxy 112 via communication network 110. As can be appreciated, not all of the network elements 104, and hence not all of the respective UAs 108, are routed through the proxy server 112. Rather, in some embodiments, it is contemplated that the network element 104 may be connected to the SIP conference controller 120 directly via network 110.

While the above-described flowcharts and state diagrams have been discussed in relation to a particular sequence of events, it should be appreciated that changes to this sequence can occur without materially affecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols, and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods, and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. The system can also be implemented by physically incorporating the system and/or method into a software and/or hardware system, such as the hardware and software systems of a communications device or system.

It is therefore apparent that there has been provided, in accordance with embodiments of the present invention, systems, apparatuses, and methods for enhancing call preservation techniques. While this invention has been described in conjunction with a number of embodiments, it is evident that many alternatives, modifications, and variations would be or are apparent to those of ordinary skill in the applicable arts. Accordingly, it is intended to embrace all such alternatives, modifications, equivalents, and variations that are within the spirit and scope of this invention.

What is claimed is:

1. A method of managing a Session Initiation Protocol (SIP) dialog between a network element and a conference controller during a SIP conference call, the method comprising:
   sending, by the network element, a first INVITE message to the conference controller, the first INVITE message including a session description protocol (SDP) offer;
   establishing a first SIP dialog between the network element and the conference controller;
   in response to a signaling-disrupting event having occurred during the SIP conference call, sending, by the network element, a second INVITE message to the conference controller, the second INVITE message including the same SDP offer as the first INVITE message; and
   establishing a second SIP dialog between the network element and the conference controller before terminating the first SIP dialog.

2. The method according to claim 1, wherein establishing the second SIP dialog between the network element and the conference controller includes:
   receiving, at the network element, an out-of-dialog SIP REFER message including a Request-URI header, the Request-URI header including a unique conference identifier; and
   sending, by the network element, the second INVITE message to a device associated with the unique conference identifier.

3. The method according to claim 2, further comprising:
   receiving, at the network element, a unique session identifier;
   identifying a dialog based on the unique session identifier; and
   terminating the identified dialog.

4. The method according to claim 3, wherein the identified dialog is for a call that is in a connection preserved state for the SIP conference call.

5. The method according to claim 1, further comprising:
   receiving, at the conference controller, a unique session identifier and a unique conference identifier; and
   generating, by the conference controller, a SIP REFER message including the unique session identifier and the unique conference identifier.

6. The method according to claim 5, wherein the unique session identifier and the unique conference identifier are received in response to determining that the signaling-disrupting event has occurred during the SIP conference call.

7. The method according to claim 1, further comprising:
   receiving, at a media gateway, a unique session identifier per ephemeral termination, wherein at least one media path is active between the media gateway and the network element.

8. The method according to claim 7, further comprising:
   receiving, at the media gateway, a unique conference identifier; and
   associating the unique session identifier and the unique conference identifier to an ephemeral termination.

9. The method according to claim 8, wherein when the SIP conference call spans multiple media gateways, the unique conference identifier is provided to all terminations for the SIP conference call on each one of the multiple media gateways.

10. The method according to claim 8, further comprising:
    providing the unique conference identifier, the unique session identifier, and a plurality of contexts within the media gateway having the unique conference identifier and the unique session identifier to the conference controller.

11. The method according to claim 10, further comprising:
    receiving, at the media gateway, at least one of feature information and policy information; and
    providing the at least one of feature information and policy information to the conference controller.

12. The method according to claim 1, further comprising:
    receiving, at the conference controller, the first INVITE message from the network element, the first INVITE message including the session description protocol (SDP) offer;
    generating a unique session identifier and a unique conference identifier;
    providing the unique session identifier and the unique conference identifier to a media gateway, wherein at least one media path is active between the media gateway and the network element;
    receiving, at the conference controller, the unique session identifier and the unique conference identifier in response to the signaling-disrupting event having occurred during the SIP conference call; and
    generating, by the conference controller, an out-of-dialog SIP REFER message including a Request-URI header, the Request-URI header including the unique conference identifier.

13. The method according to claim 1, wherein an existing media path associated with the first SIP dialog between the network element and a media gateway is maintained when the second SIP dialog is established.

14. A system comprising:
    a network element including:
    a processor; and
    memory including one or more instructions that when executed by the processor, enable the network element to:
    send a first INVITE message to a conference controller, the first INVITE message including a session description protocol (SDP) offer;
    establish a first SIP dialog between the network element and the conference controller;
    in response to a signaling-disrupting event having occurred during a SIP conference call, send a second INVITE message to the conference controller, the second INVITE message including the same SDP offer as the first INVITE message; and establish a second SIP dialog between the network element and the conference controller before terminating the first SIP dialog.

15. The system of claim 14, wherein the network element includes a SIP user agent.

16. The system of claim 15, wherein the network element is further configured to receive a SIP REFER message including a unique session identifier and a unique conference identifier in at least one header of the SIP REFER message.

17. The system according to claim 16, wherein the unique session identifier and the unique conference identifier are received in response to determining that the signaling-disrupting event has occurred during the SIP conference call.

18. The system according to claim 14, wherein the unique session ID is received per ephemeral termination for a media gateway.

19. A non-transitory computer readable medium having stored thereon instructions that cause a processor to execute a method, the instructions comprising:

one or more instructions to send, from a SIP user agent to a conference controller, a first INVITE message, the first INVITE message including a session description protocol (SDP) offer;

one or more instructions to establish a first Session Initiation Protocol (SIP) dialog between the SIP user agent and the conference controller;

one or more instructions to send, by the SIP user agent, a second INVITE message to the conference controller in response to a signaling-disrupting event having occurred during a SIP conference call, the second INVITE message including the same SDP offer as the first INVITE message; and one or more instructions to establish a second SIP dialog between the SIP user agent and the conference controller before terminating the first SIP dialog.

* * * * *